United States Patent
Kobayashi (10) Patent No.: US 9,678,663 B2
(45) Date of Patent: Jun. 13, 2017

(54) DISPLAY SYSTEM AND OPERATION INPUT METHOD

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 282 days.

(21) Appl. No.: 13/686,256

(22) Filed: Nov. 27, 2012

(65) Prior Publication Data

US 2013/0139093 A1    May 30, 2013

(30) Foreign Application Priority Data

Nov. 28, 2011  (JP) ................................. 2011-258698

(51) Int. Cl.
| | |
|---|---|
| G06F 3/048 | (2013.01) |
| G06F 3/0488 | (2013.01) |
| G06F 1/16 | (2006.01) |
| G06F 3/01 | (2006.01) |

(52) U.S. Cl.
CPC .......... G06F 3/04886 (2013.01); G06F 1/163 (2013.01); G06F 1/1639 (2013.01); G06F 1/1673 (2013.01); G06F 3/011 (2013.01)

(58) Field of Classification Search
CPC ...... G06F 3/04886; G06F 3/011; G06F 1/163; G06F 1/1639; G06F 1/1673
See application file for complete search history.

(56) References Cited

U.S. PATENT DOCUMENTS

| | | | | |
|---|---|---|---|---|
| 5,907,434 | A * | 5/1999 | Sekine | H04N 5/2259 348/335 |
| 5,977,935 | A * | 11/1999 | Yasukawa et al. | 345/8 |
| 6,281,878 | B1 * | 8/2001 | Montellese | G06F 3/0428 345/156 |
| 6,320,559 | B1 * | 11/2001 | Yasukawa et al. | 345/7 |
| 7,113,151 | B2 * | 9/2006 | Kinebuchi | 345/8 |
| 8,514,194 | B2 * | 8/2013 | Lawrence et al. | 345/173 |
| 8,814,691 | B2 * | 8/2014 | Haddick | G02B 27/017 463/30 |
| 8,941,620 | B2 * | 1/2015 | Sze et al. | 345/175 |
| 2002/0110266 | A1 * | 8/2002 | Teng | G06K 9/00046 382/127 |
| 2003/0107785 | A1 * | 6/2003 | Takeyama | G02B 5/32 359/15 |
| 2004/0135915 | A1 * | 7/2004 | Ueda | B26F 1/02 348/335 |

(Continued)

FOREIGN PATENT DOCUMENTS

| | | |
|---|---|---|
| JP | A-11-312033 | 11/1999 |
| JP | A-2000-172371 | 6/2000 |

(Continued)

*Primary Examiner* — William Bashore
*Assistant Examiner* — James F Sugent
(74) *Attorney, Agent, or Firm* — Oliff PLC (57) ABSTRACT

A display system includes a sensor unit that detects the position of a pointing object in contact with a predetermined object, a control apparatus that sets a key layout on the object and recognizes a key operated by the pointing object based on the position of the pointing object relative to the key layout, and a display apparatus that receives operational input from the operated key.

18 Claims, 9 Drawing Sheets

(56) References Cited

U.S. PATENT DOCUMENTS

| | | | |
|---|---|---|---|
| 2006/0055672 A1* | 3/2006 | Krocker | G06F 3/0304 345/158 |
| 2007/0153115 A1* | 7/2007 | Ueda | G02B 5/04 348/335 |
| 2008/0117316 A1* | 5/2008 | Orimoto | H04N 5/2251 348/240.3 |
| 2009/0136212 A1* | 5/2009 | Klein | 386/117 |
| 2010/0103078 A1 | 4/2010 | Mukawa et al. | |
| 2012/0249587 A1* | 10/2012 | Anderson et al. | 345/633 |

FOREIGN PATENT DOCUMENTS

| | | |
|---|---|---|
| JP | B2-3872100 | 1/2007 |
| JP | A-2008-020770 | 1/2008 |
| JP | B2-4055283 | 3/2008 |
| JP | 2010-067062 A | 3/2010 |
| JP | 2010-152930 A | 7/2010 |
| JP | A-2010-146481 | 7/2010 |
| JP | B2-4636164 | 2/2011 |
| JP | 2011-070414 A | 4/2011 |
| WO | WO 2009/041055 A1 | 4/2009 |

* cited by examiner

DISPLAY SYSTEM AND OPERATION INPUT METHOD

BACKGROUND

1. Technical Field

The present invention relates to a display system and an operation input method.

2. Related Art

A head mounted display (display system) disclosed in JP-A-2000-172371 includes a hardware keyboard as an input device.

A hardware keyboard is, however, difficult to carry in terms of size, weight, and other mobility-related points. On the other hand, a smartphone, a mobile phone, and other mobile terminals (display systems) include a touch panel or dedicated keys as an input device. A touch panel and dedicated keys, however, also have difficulties when they are used with a mobile terminal. That is, to improve operability, an input device needs to be reasonably large, whereas to improve mobility, the input device needs to be reasonably small.

SUMMARY

An advantage of some aspects of the invention is to provide a display system that excels in operability and mobility and an operation input method.

An aspect of the invention relates to a display system including a sensor unit that detects the position of a pointing object in contact with a predetermined object, a control apparatus that sets a key layout on the object and recognizes a key operated by the pointing object based on the position of the pointing object relative to the key layout, and a display apparatus that is wearable around the head of a user and receives operational input from the operated key.

In the configuration described above, the control apparatus sets a key layout on an object and recognizes a key operated by the pointing object based on the position of the pointing object relative to the key layout, whereby the display system requires no dedicated input device and hence can increase its operability and mobility.

Another aspect of the invention relates to the display system according to the above aspect of the invention, wherein the display apparatus includes an image pickup section having an image pickup area, the image pickup section presents predetermined image light visible to the user in the image pickup area, and the image pickup area transmits externally incident light.

The configuration described above allows the user to view an optical image of the object in the image pickup area.

Still another aspect of the invention relates to the display system according to the above aspect of the invention, wherein the display apparatus superimposes a key image showing the key layout contained in the predetermined image light on an optical image of the object having passed through the image pickup area based on the position of the display apparatus relative to the object and display the resultant image.

The configuration described above allows the user to issue an operational input while looking at the displayed key image to check the key layout.

Yet another aspect of the invention relates to the display system according to the above aspect of the invention, wherein the display apparatus displays another image in the image pickup area in such a way that the other image does not overlap with the key image showing the key layout.

The thus configured display apparatus can present a displayed image (operationally inputted image) and the key image in such a way that they do not overlap with each other even when the user moves the head.

Still yet another aspect of the invention relates to the display system according to the above aspect of the invention, wherein the display apparatus displays the key image showing the key layout after adjusting the size of the key image.

The thus configured display apparatus can present a displayed image (operationally inputted image) and the key image in such a way that they do not overlap with each other for ease of observation.

Further another aspect of the invention relates to the display system according to the above aspect of the invention, wherein the control apparatus sets the key layout based on the position of the pointing object having come into contact with the object.

The configuration described above allows the user to set a key layout of appropriate size on the object used as an input device.

Still further another aspect of the invention relates to the display system according to the above aspect of the invention, wherein the control apparatus sets the key layout based on user's selection.

The configuration described above allows the user to select a key layout to be set on the object used as an input device.

Yet further another aspect of the invention relates to the display system according to the above aspect of the invention, wherein the sensor unit projects at least one of an infrared light flux and an ultrasonic wave and detects the position of the pointing object based on reflection from the pointing object.

The configuration described above allows the user to issue an operational input by using a finger that types something on an object used as an input device.

Still yet further another aspect of the invention relates to the display system according to the above aspect of the invention, wherein the sensor unit captures an image of the pointing object and detects the position of the pointing object based on the captured image of the pointing object.

The thus configured sensor unit can detect the position of the pointing object based on the image.

A further aspect of the invention relates to the display system according to the above aspect of the invention, wherein the display apparatus includes an image output section that outputs the predetermined image light, a projection optical system that projects the predetermined image light outputted from the image output section, and a light guide section that guides the predetermined image light projected through the projection optical system to the image pickup area.

The thus configured display apparatus receives the operational input, whereby the user who wears the display apparatus around the head can issue an operational input by using the pointing object through the object used as an input device.

A still further aspect of the invention relates to an operation input method used with a display system. The method includes setting a key layout on a predetermined object by using a control apparatus, detecting the position of a finger of a user having come into contact with the object by using a sensor unit, recognizing a key operated by the finger based on the position of the finger relative to the key layout by using the control apparatus, and receiving operational input from the operated key by using a display apparatus wearable around the head of the user.

The method described above allows the control apparatus to set a key layout on an object and recognize a key operated by a finger based on the position of the finger relative to the key layout, whereby the display system requires no dedicated input device and hence can increase its operability and mobility.

According to the aspects of the invention, the control apparatus sets a key layout on an object and recognizes a key operated by a finger based on the position of the finger relative to the key layout, whereby the display system can increase its operability and mobility.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
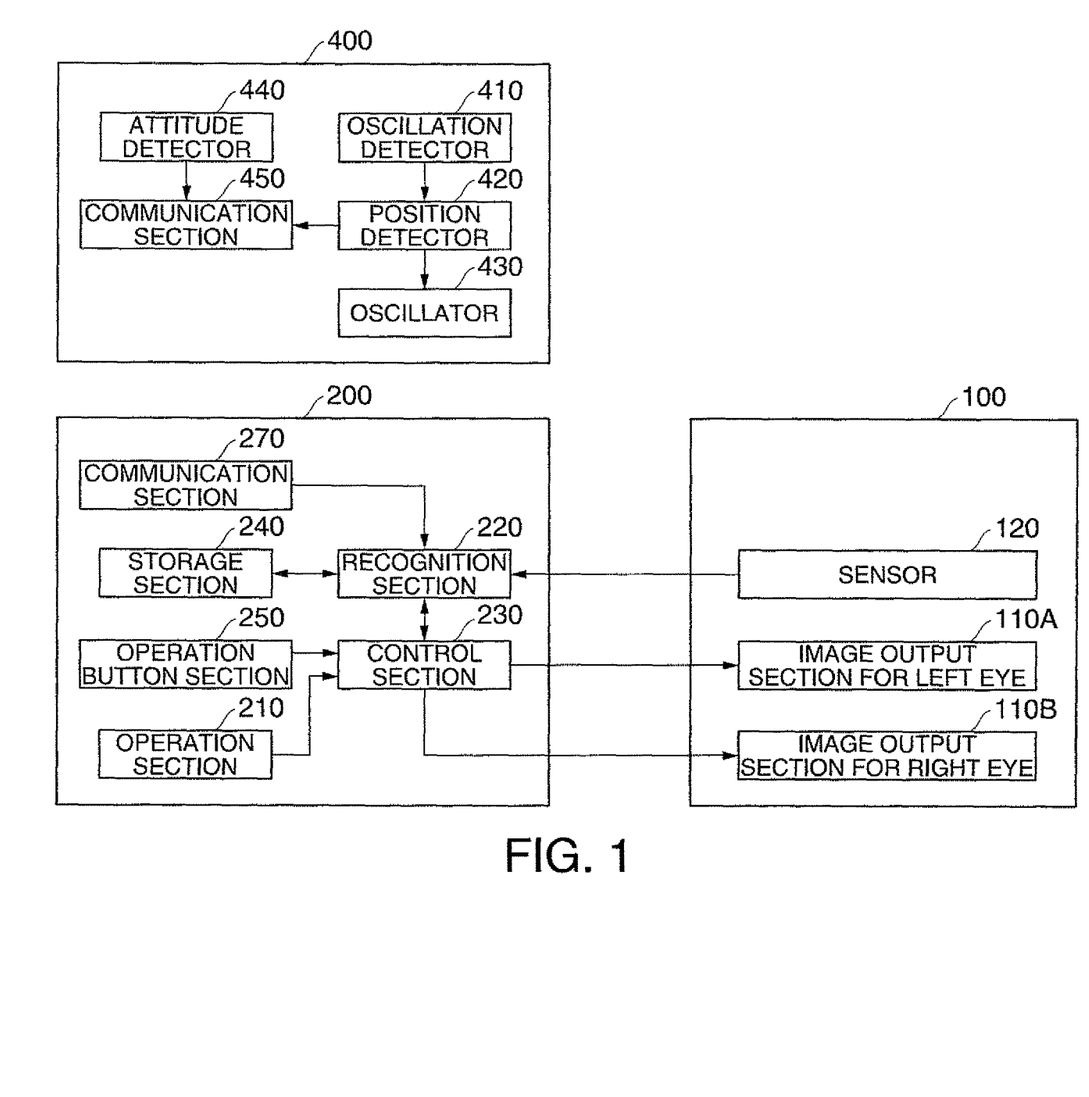
FIG. 1 is a block diagram showing an example of the configuration of a display system in an embodiment of the invention.
Figure 2:
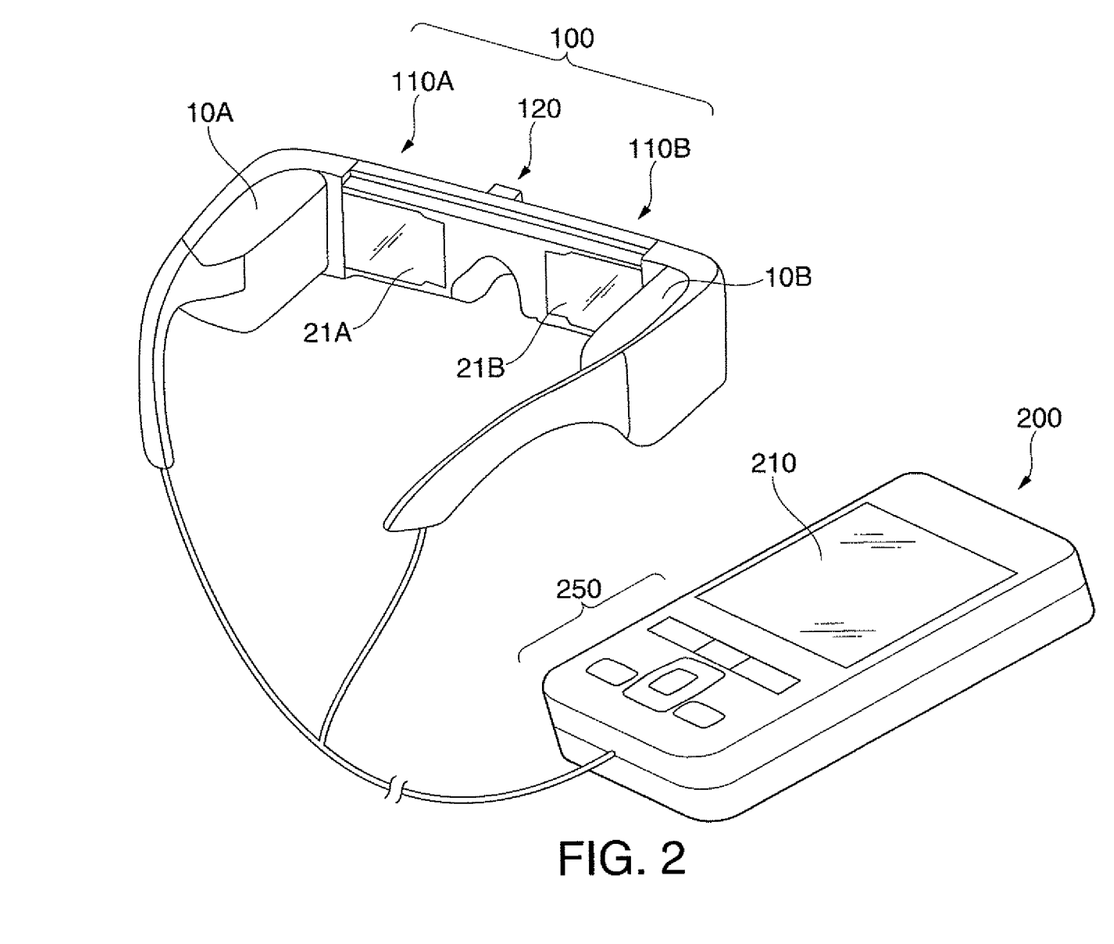
FIG. 2 is an exterior view of a display apparatus and a control apparatus in the embodiment of the invention.

An embodiment of the invention will be described in detail with reference to the drawings. FIG. 1 is a block diagram showing an example of the configuration of a display system. FIG. 2 is an exterior view showing a display apparatus and a control apparatus. The display system includes a display apparatus 100 (see-through-type head mounted display, transmissive display apparatus), a control apparatus 200 (controller), and a sensor unit 400.

A user who wears the display apparatus 100 (of eyeglass type) around the head can view a predetermined image (menu image, icon image, for example) displayed (presented) in an image pickup area of an image pickup section of the display apparatus 100. The image pickup area of the image pickup section of the display apparatus 100 is configured to transmit at least part of the incident light, whereby the user can view the control apparatus 200 through the image pickup area of the image pickup section of the display apparatus 100 with the display apparatus 100 worn around the head. That is, the user can simultaneously view an optical image formed by the incident light and the displayed predetermined image.

An example of the configuration of the display apparatus will first be described.

The display apparatus 100 includes an image output section for the left-eye 110A, an image output section for the right-eye 110B, and a sensor 120. The image output section for the left-eye 110A includes an image formation section for the left eye 10A and an image pickup section 21A. The image formation section for the left eye 10A is so disposed in a left temple of the display apparatus 100 that the image formation section for the left eye 10A is located to the left of the head of the user who wears the display apparatus 100. An image signal is inputted from the control apparatus 200 to the image formation section for the left eye 10A, which forms predetermined image light for the left eye of the user and outputs the thus formed predetermined image light to the image pickup area of the image pickup section 21A.

The predetermined image for the left eye of the user is displayed in the image pickup area of the image pickup section 21A. The image pickup section 21A is so disposed in a left rim of the display apparatus 100 that the image pickup section 21A is located in front of the left eye of the user who wears the display apparatus 100. The image pickup area of the image pickup section 21A is configured to transmit at least part of the incident light, whereby an optical image formed by the incident light is guided to the left eye of the user.

The image output section for the right-eye 110B includes an image formation section for the right eye 10B and an image pickup section 21B. The image formation section for the right eye 10B is so disposed in a right temple of the display apparatus 100 that the image formation section for the right eye 10B is located to the right of the head of the user who wears the display apparatus 100. An image signal is inputted from the control apparatus 200 to the image formation section for the right eye 10B, which forms predetermined image light for the right eye of the user and outputs the thus formed predetermined image light to the image pickup area of the image pickup section 21B.

The predetermined image for the right eye of the user is displayed in the image pickup area of the image pickup section 21B. The image pickup section 21B is so disposed in a right rim of the display apparatus 100 that the image pickup section 21B is located in front of the right eye of the user who wears the display apparatus 100. The image pickup area of the image pickup section 21B is configured to transmit at least part of the incident light, whereby an optical image formed by the incident light is guided to the right eye of the user.

Figure 3:
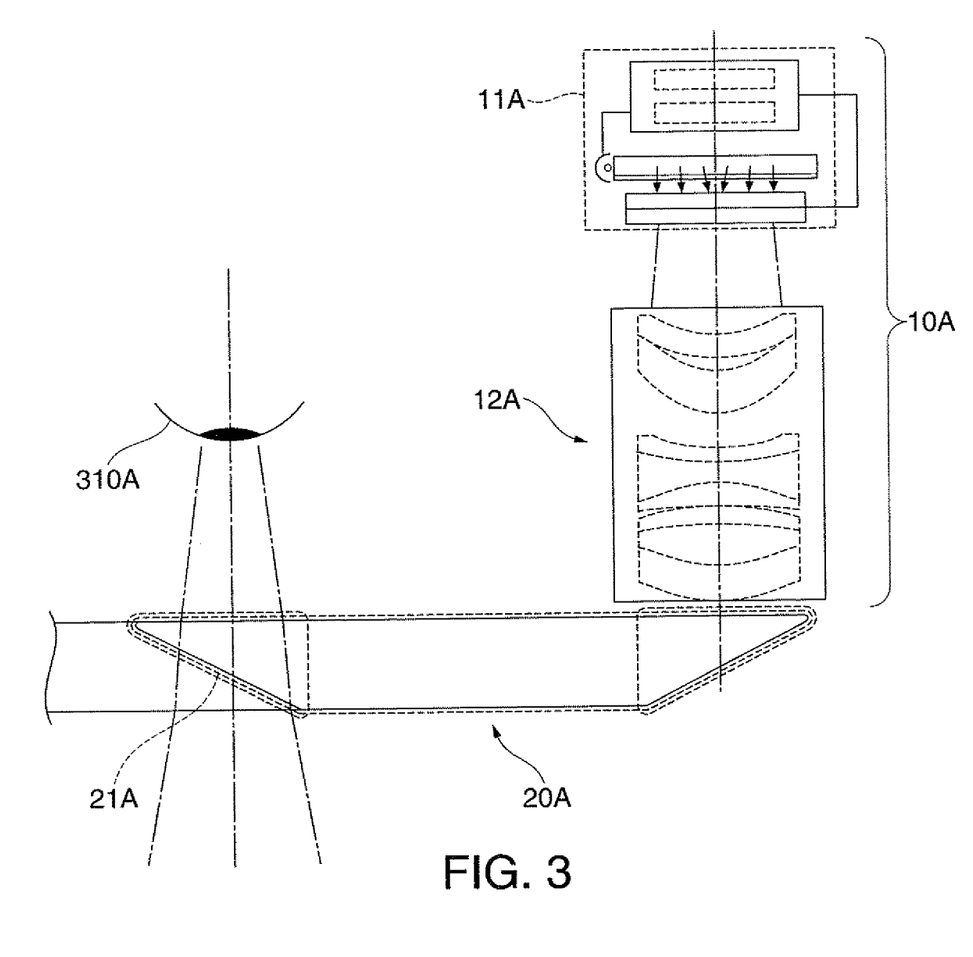
FIG. 3 is a plan view showing an example of the configuration of the display apparatus in the embodiment of the invention.

FIG. 3 is a plan view showing the example of the configuration of the display apparatus. The image output section for the left-eye 110A and the image output section for the right-eye 110B are configured in a bilaterally symmetric manner, and only an example of the configuration of the image output section for the left-eye 110A will therefore be described.

The image output section for the left-eye 110A includes the image formation section for the left eye 10A and a light guide section for the left eye 20A. The image formation section for the left eye 10A includes an image generation section 11A and a projection optical system 12A (projection lens). The image generation section 11A includes a light source (light emitting diode: LED, for example) and a light modulator (liquid crystal display device, for example) for each color emission.

An image signal is inputted from the control apparatus 200 to the image generation section 11A. In the image generation section 11A, an optical system diffuses red light, green light, and blue light emitted from the light sources and projects the diffused light onto the light modulators. The light modulators spatially modulate the red light, the green light, and the blue light in accordance with the image signal inputted from the control apparatus 200 and outputs image light according to the image signal. The projection optical system 12A converts the image light outputted from the light modulators into a parallelized light flux.

The light guide section for the left eye 20A projects the image light, which is the light flux parallelized by the projection optical system 12A, onto the image pickup area formed on a surface of the image pickup section 21A (triangular prism, for example) provided in the light guide section for the left eye 20A. The surface of the image pickup section 21A has front and rear sides, and one of the sides (image pickup area) that faces a left eye 310A of the user who wears the display apparatus 100 has a mirror layer or any other reflection coating formed thereon. The image light projected onto the image pickup area of the image pickup section 21A undergoes total reflection at the surface having the reflection coating and is directed toward the left eye 310A of the user, whereby a predetermined image (menu image, key image, for example) is displayed in the image pickup area of the image pickup section 21A. On the other hand, at least part of the light externally incident on the image pickup area of the image pickup section 21A passes through the image pickup area of the image pickup section 21A and is guided to the left eye 310A of the user, whereby the user can view the predetermined image formed by the image formation section for the left eye 10A with an optical image formed by the incident light superimposed on the predetermined image in the image pickup area of the image pickup section 21A.

Refer to FIGS. 1 and 2 again and resume the description of the example of the configuration and the exterior appearance of the display system. In the following sections, items common to the image pickup section 21A and the image pickup section 21B are described as "image pickup section 21" with the Roman reference characters omitted.

The sensor 120 is an imaging device that captures an image of an object external to the display apparatus 100. The sensor 120 is so disposed at a rim or a bridge of the display apparatus 100 that the sensor 120 is located in front of the head of the user who wears the display apparatus 100. For example, when the face of the user who wears the display apparatus 100 faces an object, the sensor 120 can capture an image of the exterior of the object and output an image signal carrying the captured image.

The sensor 120 may be provided in a plurality of positions. In this case, the sensors 120 can capture images of an object external to the display apparatus 100 along a plurality of directions.

An example of the configuration of the sensor unit will next be described.

The sensor unit 400 is attached to an object specified as an input device by the user in advance (hereinafter referred to as "keyboard object"). When the keyboard object is, for example, a rectangular, plate-shaped object, the sensor unit 400 may be attached to any of the corners of the plate-shaped object. The shape of the keyboard object is not limited to a rectangle.

The sensor unit 400 includes an oscillation detector 410, a position detector 420, an oscillator 430, an attitude detector 440, a communication section 450, and a power supply (not shown). The power supply supplies the components described above with electric power.

The oscillation detector 410 detects the magnitude of oscillation applied to the keyboard object and outputs a signal representing the magnitude of the oscillation to the position detector 420. For example, the oscillation detector 410 detects oscillation produced by a finger of the user, a touch pen, a writing tool, or any other pointing object with which the user types something on the keyboard object and the magnitude of the oscillation. The oscillation detector 410 may detect the magnitude of oscillation applied to the keyboard object with a touch pen (pointing stick) or any other similar object from which no writing tip is exposed.

The position detector 420, to which a signal showing that oscillation has been detected is inputted, detects the position of a finger of the user, a touch pen, a writing tool, or any other pointing object that has touched the keyboard object relative to the sensor unit 400. The description will be continued below by assuming that the pointing object is a finger of the user by way of example. The position detector 420 projects infrared (IR) light onto the finger of the user and detects the position of the finger based on the light reflected off the finger. For example, the position detector 420 may detect the position of the finger based on triangulation in which a plurality of infrared light fluxes are projected onto the finger. Alternatively, for example, the position detector 420 (imaging sensor) may capture an image of the finger of the user and detect the position of the finger based on the captured image. Still alternatively, for example, the position detector 420 (ultrasonic sensor) may project an ultrasonic wave onto the finger of the user and detect the position of the finger based on the wave reflected off the finger. The position detector 420 may combine any of the plurality of detection results.

To position the keyboard object (which will be described later with reference to FIG. 8), the position detector 420 uses the detected position of the finger of the user as a reference point (origin, for example) of the coordinates on the keyboard object. After the positioning, the position detector 420 outputs a signal representing the position of a detected position of the finger of the user relative to the reference point of the coordinates (hereinafter referred to as "finger position signal") to the communication section 450. The position detector 420, to which a signal showing that oscillation has been detected is inputted, instructs the oscillator 430 to oscillate in accordance with the signal representing the magnitude of the oscillation.

The oscillator 430 oscillates at the magnitude of oscillation controlled by the position detector 420. The oscillator 430 can therefore provide a clicking sensation according to the magnitude of the oscillation produced by typing operation to the user's finger that has touched the keyboard object.

The attitude detector 440 detects the attitude of the sensor unit 400 and outputs a signal representing the detected attitude (hereinafter referred to as "attitude signal") to the communication section 450. When the sensor unit 400 is attached to the keyboard object, the attitude detector 440 detects the attitude of the keyboard object. The attitude detector 440 is, for example, a gyro sensor and an acceleration sensor.

The finger position signal and the attitude signal are inputted to the communication section 450, which forwards the finger position signal and the attitude signal to the control apparatus 200. The forwarding operation may be performed based on Bluetooth®.

Figure 4:
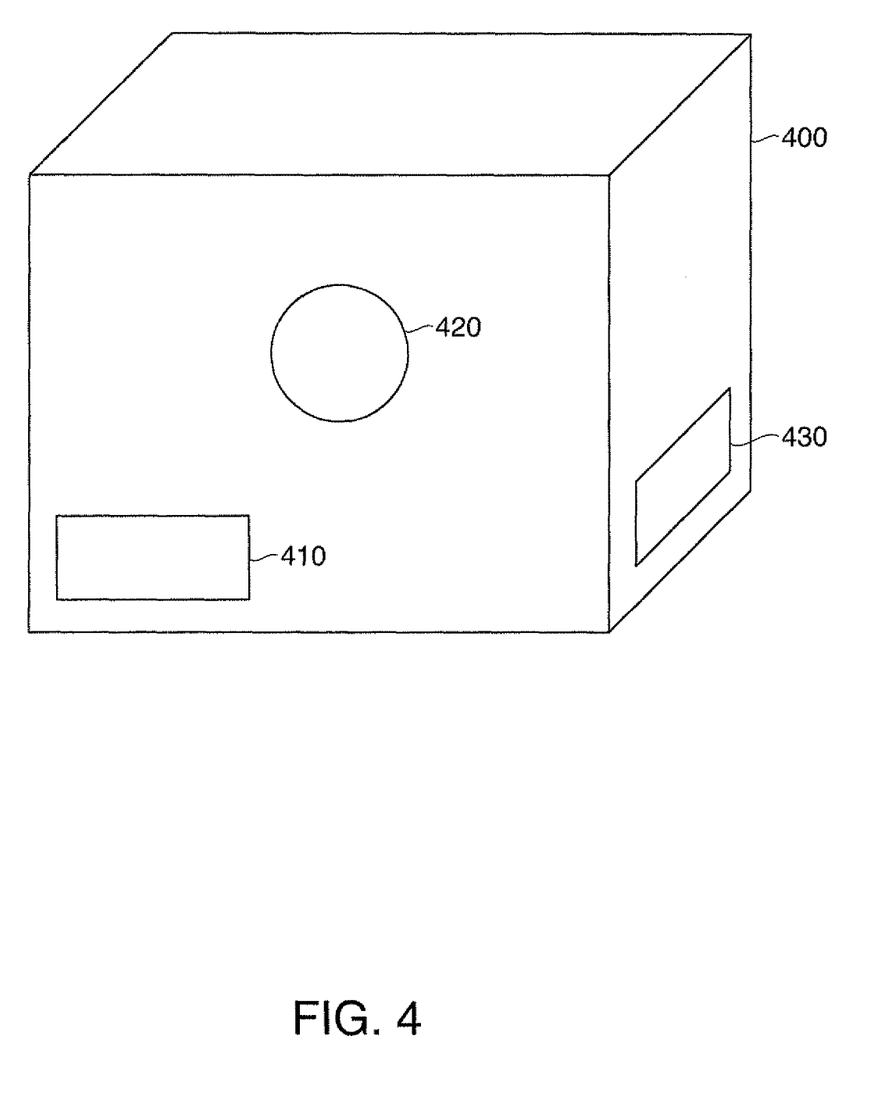
FIG. 4 is an exterior view of a sensor unit in the embodiment of the invention.

FIG. 4 is an exterior view of the sensor unit. In FIG. 4, the sensor unit 400 has a hexahedral shape by way of example.

The position detector 420 and the oscillation detector 410 are, for example, disposed on the same surface of the sensor unit 400. The sensor unit 400 is so attached to the keyboard object that the position detector 420 and the oscillation detector 410 are both oriented toward the pointing object. On the other hand, the oscillator 430 may be disposed on a surface different from the surface on which the oscillation detector 410 is disposed. In this configuration, in which the oscillation detector 410 is separate from the oscillator 430, the oscillation detector 410 does not detect oscillation produced by the oscillator 430 but detects only oscillation produced by the pointing object.

An example of the configuration of the control apparatus will next be described.

The control apparatus 200 virtually sets a key layout on an external keyboard object. That is, the control apparatus 200 relates the coordinates on the keyboard object to the coordinates of each key and stores the positional relationship. The control apparatus 200 recognizes a key operated by the finger of the user based on the position of the finger relative to the reference point contained in the finger position signal and the coordinates of each key (key layout).

The control apparatus 200 controls the display apparatus 100 based on an operation input signal according to the operated key. The control apparatus 200 includes an operation section 210, a recognition section 220, a control section 230, a storage section 240, an operation button section 250, and a communication section 270.

The operation section 210 detects the position where the finger of the user who is issuing operational input through an operation surface of the operation section 210 is touching in the form of absolute coordinates on the operation surface and outputs a signal representing the detected absolute coordinates (hereinafter referred to as "coordinate signal") to the control section 230. The operation section 210 is, for example, a track pad.

The storage section 240 stores in advance key images (keyboard images) related to the types of input devices. Examples of the key images include a ten-key (TenKey) image, a mobile terminal (MobileKey: 4×3 key layout formed of numeral, character, and Roman letter keys, for example) image, a game controller (GameCTL: key layout formed of direction keys and ENTER key, for example) image, and a QWERTY keyboard (QWERTY) image.

The operation button section 250 includes a group of operation buttons. Each of the operation buttons, when pressed by the user, outputs a signal representing a process related in advance to the pressed operation button to the control section 230. The process related in advance to a pressed button is, for example, a process of adjusting the brightness of an image projected in the image pickup area of the image pickup section 21 (see FIG. 2).

The communication section 270 receives a finger position signal and the attitude signal described above from the sensor unit 400 and forwards them to the recognition section 220.

The communication section 270 inputs the finger position signal and the attitude signal to the recognition section 220. The sensor 120 further inputs an image signal carrying a captured image to the recognition section 220. The recognition section 220 recognizes the size, shape, and other attributes of the keyboard object based on the image signal carrying a captured image.

The storage section 240 stores in advance key images related to input devices, and the control section 230 inputs a signal representing the type of the input device selected by the user among the types of input devices to the recognition section 220. The recognition section 220 then acquires a key image of the selected input device from the storage section 240 based on the signal representing the type of the selected input device.

The recognition section 220 deforms the key image acquired from the storage section 240 as required based on the image signal carrying the image of the keyboard object in such a way that the size and shape of the optical image of the keyboard object and the size and shape of the key image agree with each other in the image pickup area of the image pickup section 21.

The recognition section 220 further corrects the position of the key image acquired from the storage section 240 in the image pickup area of the image pickup section 21 based on the image signal carrying the image of the keyboard object and the attitude signal in such a way that the position where the optical image of the keyboard object is displayed and the position where the key image is displayed agree with each other in the image pickup area of the image pickup section 21. The recognition section 220 outputs an image signal carrying the thus deformed, corrected key image (original key image when no deformation or correction is made) to the control section 230, whereby the user who, for example, faces upward, can view the key image having moved downward accordingly. Further, for example, when the keyboard object is completely out of sight of the user, the key image will not be projected in the image pickup area of the image pickup section 21.

The recognition section 220 recognizes a key operated by the finger of the user based on the position of the finger relative to the reference point contained in the finger position signal and the coordinates of each key. The recognition section 220 further notifies the control section 230 of operated key identification information.

The control section 230 outputs image signals to the image output section for the left-eye 110A and the image output section for the right-eye 110B of the display apparatus 100. The image output section for the left-eye 110A and the image output section for the right-eye 110B having received the image signals display, for example, a menu image. An image signal outputted to the image output section for the left-eye 110A and an image signal outputted to the image output section for the right-eye 110B may differ from each other in terms of content (parallax may be present between images, for example). For example, when left and right images have parallax therebetween, the images form a three-dimensional image.

That is, the control section 230 receives the image signal carrying the deformed, corrected key image (original key image when no deformation or correction is made) from the recognition section 220 and forwards the image signal to the display apparatus 100, whereby the key image is so projected in the image pickup area of the image pickup section 21 that the key image is superimposed on the optical image of the keyboard object.

Further, the recognition section 220 forwards the operated key identification information to the control section 230, which then carries out a process related in advance to the operated key identification information (process of displaying a character on the display apparatus 100, for example).

Whenever an operation button is pressed, the operation button section 250 inputs a signal representing a process related in advance to the pressed operation button to the control section 230. Based on the signal representing a process related in advance to the pressed operation button, the control section 230 carries out the related process (process of adjusting brightness of image, for example).

The operation section 210 inputs a coordinate signal to the control section 230. Based on the inputted coordinate signal, the control section 230 carries out a process related in advance to absolute coordinates contained in the coordinate signal (process of moving cursor image in image pickup area of image pickup section 21, for example).

When the user selects the type of input device, the control section 230 forwards a signal representing the type of the selected input device to the recognition section 220.

The procedure of the operation of the display system will next be described.

Figure 5:
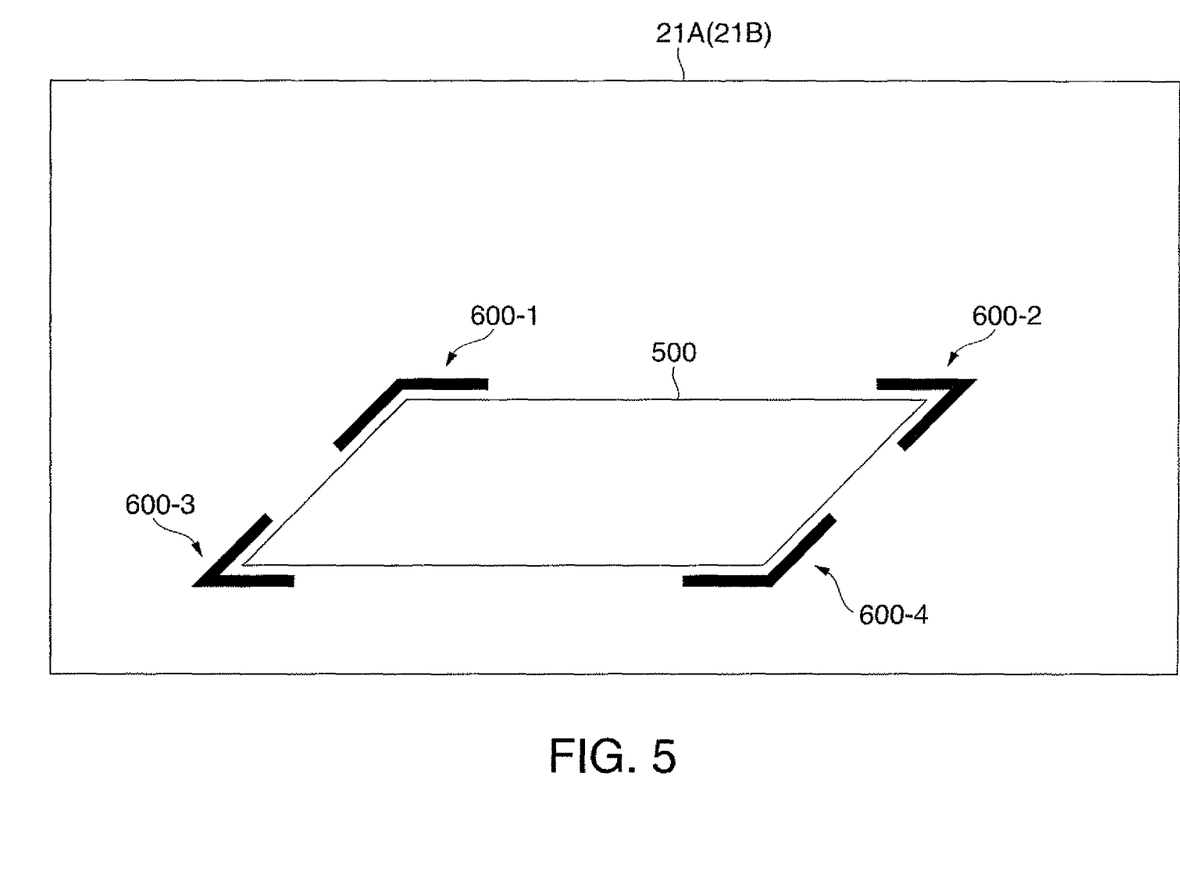
FIG. 5 shows an example of display presented when an object used as an input device is recognized in the embodiment of the invention.

FIG. 5 shows an example of display presented when an object used an input device is recognized. First, assume that a rectangular keyboard object 500 is provided in advance by the user as an input device. An optical image of the plate-shaped object 500 passes through the image pickup areas of the image pickup sections 21 of the display apparatus 100 and reaches the eyes of the user, whereby the user can view the optical image of the keyboard object 500 through the image pickup areas of the image pickup sections 21 with the display apparatus 100 worn around the head.

The sensor 120 of the display apparatus 100 captures an image of the exterior of the keyboard object 500 and outputs an image signal carrying the captured image to the recognition section 220 in the control apparatus 200. The recognition section 220 recognizes the position, the size, the shape, and other attributes of the keyboard object 500 based on the image signal carrying the captured image. The recognition section 220 further recognizes the attitude of the keyboard object 500 based on an attitude signal inputted through the communication section 270. The recognition section 220 may then project marker images 600-1 to 600-4 indicating the shape of the keyboard object 500 (corner positions, for example) in the image pickup area of the image pickup section 21.

Figure 6:
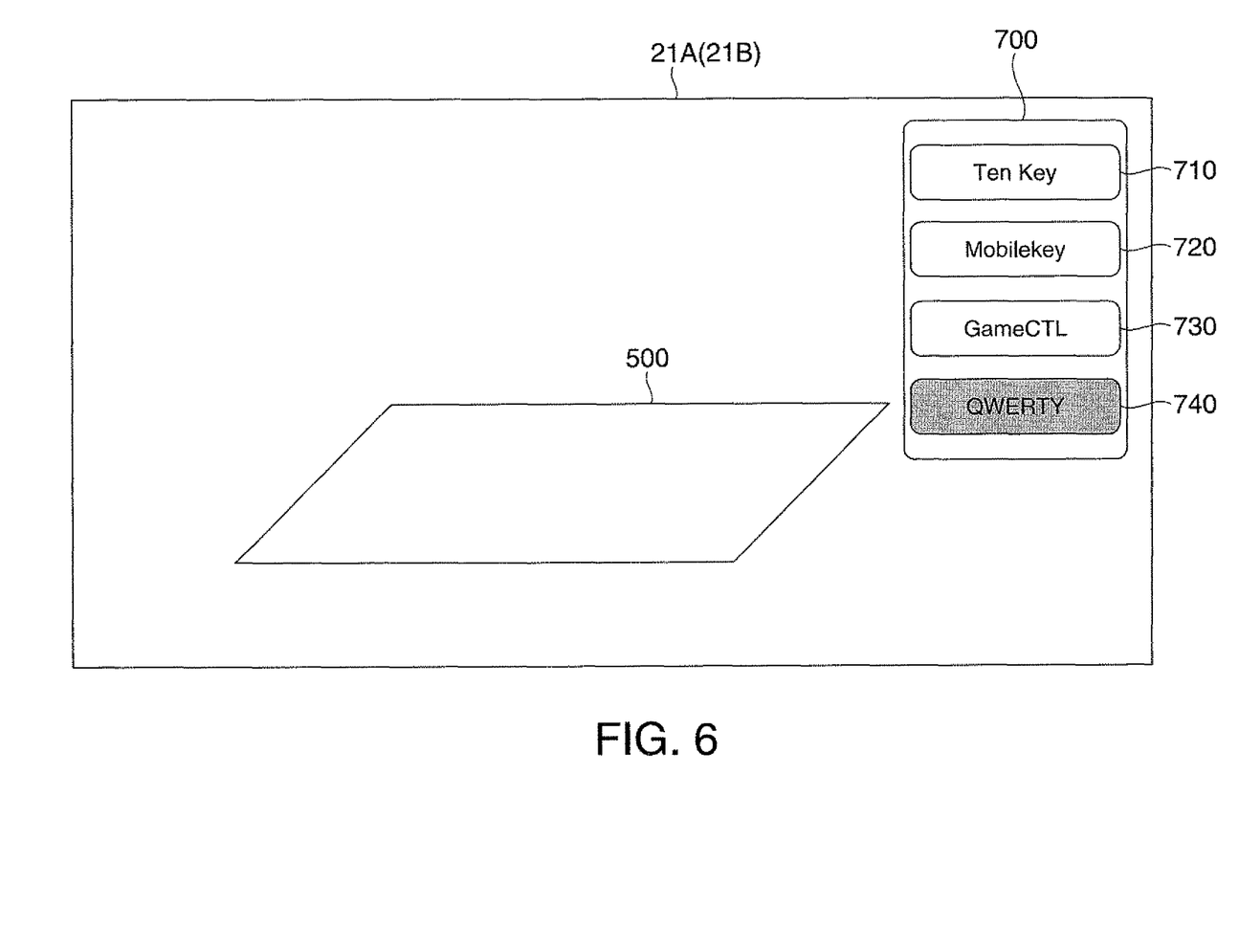
FIG. 6 shows an example of display that allows a user to select what type of input device is laid out on a keyboard object in the embodiment of the invention.

FIG. 6 shows an example of display that allows the user to select what type of input device is laid out on the keyboard object. The control section 230 outputs an image signal representing a menu list to the display apparatus 100, which displays a menu list image 700 in the image pickup area of the image pickup section 21. In FIG. 6, the menu list image 700, which allows the user to select the type of input device, shows a menu image 710 (TenKey), a menu image 720 (MobileKey), a menu image 730 (GameCTL), and a menu image 740 (QWERTY).

The user can select any of the menu images 710 to 740 by operating the operation section 210 or the operation button section 250. Each of the menu images is related to a specific type of input device. The control section 230 receives an operation input signal from the operation section 210 or the operation button section 250 and forwards the received operation input signal to the recognition section 220. The recognition section 220 acquires a key image related to the type of input device contained in the operation input signal from the storage section 240.

Figure 7:
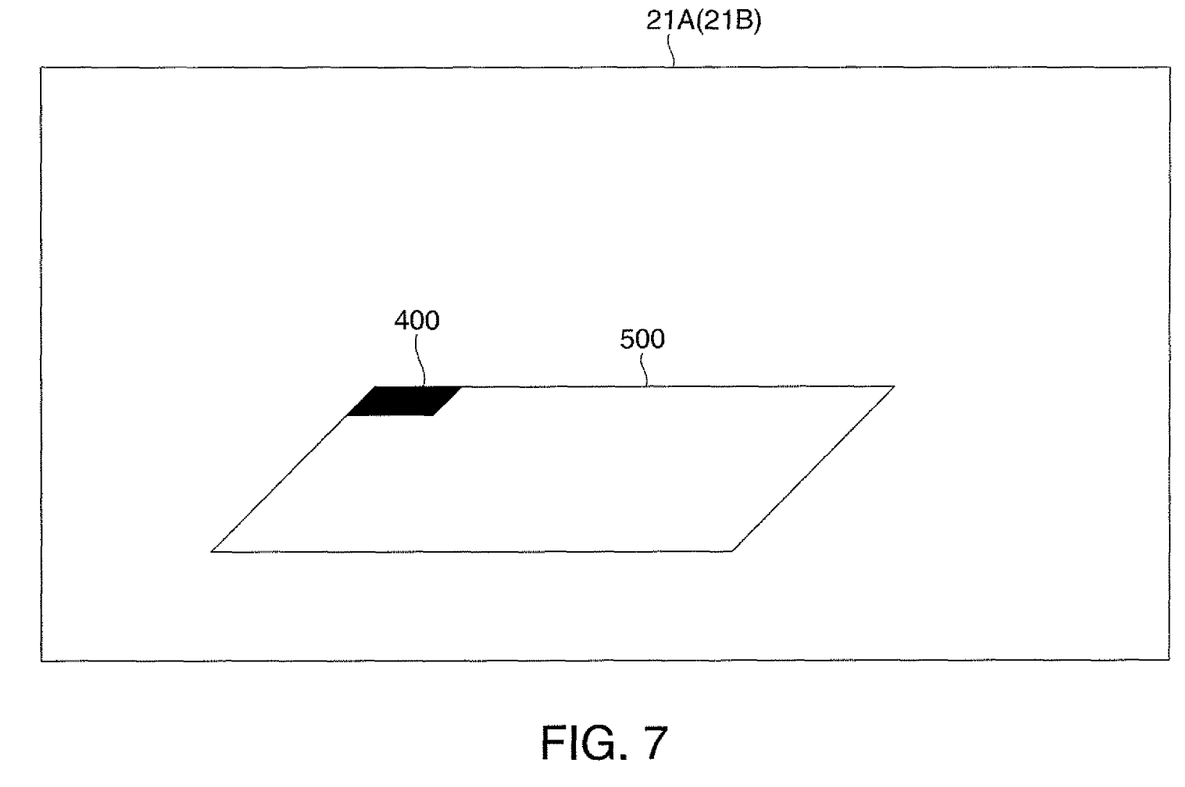
FIG. 7 is an exterior view of the keyboard object to which a sensor unit is attached in the embodiment of the invention.

FIG. 7 is an exterior view of the keyboard object to which the sensor unit is attached. It is assumed in the following description that the sensor unit 400 has been attached by the user to the upper left corner of the keyboard object 500.

Figure 8:
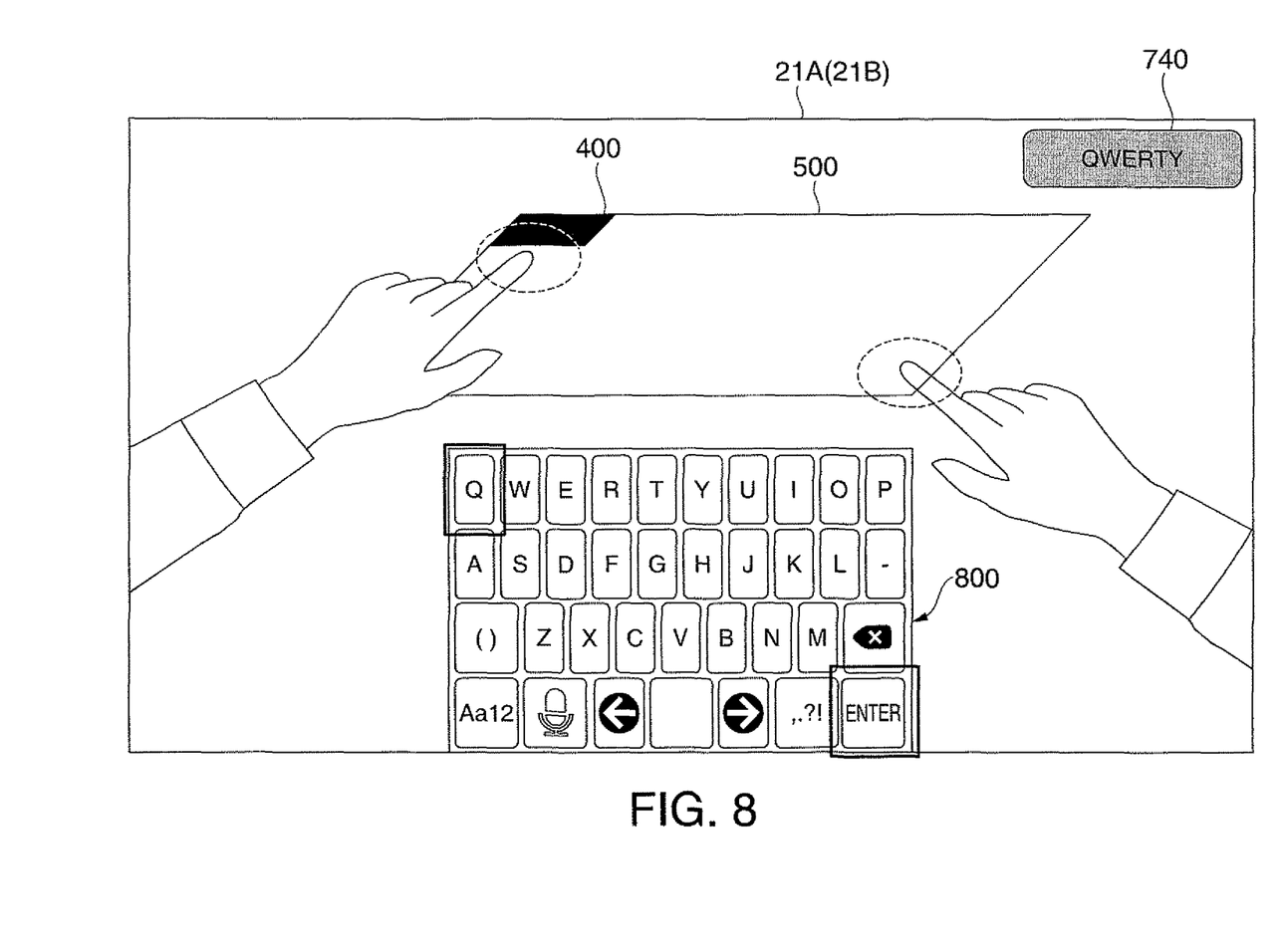
FIG. 8 shows an example of display that allows the user to position the keyboard object in the embodiment of the invention.

FIG. 8 shows an example of display that allows the user to position the keyboard object (calibration). When the menu image 740 shown in FIG. 6 is selected, the menu image 740 and a key image 800 showing a key layout related to the menu image 740 are projected in the image pickup area of the image pickup section 21 in FIG. 8. Further, among the keys that form the key image 800, the position of at least one predetermined key ("Q" and "ENTER" in FIG. 8) is indicated by a frame, whereby the user can specify a position on the keyboard object 500 (coordinate reference point) to which each predetermined key indicated by the frame is related.

More specifically, assume that the user who is looking at the image pickup area of the image pickup section 21 touches with a finger the upper left corner of the keyboard object 500 in order to display the key "Q" at the upper left corner of the optical image of the keyboard object 500 in the image pickup area of the image pickup section 21. Further assume that the user touches with another finger the lower right corner of the keyboard object 500 in order to display the key "ENTER" at the lower right corner of the optical image of the keyboard object 500 in the image pickup area of the image pickup section 21. It is noted that the number of predetermined keys may be three or greater.

In this state, the sensor unit 400 projects infrared light onto the finger that is in contact with the keyboard object 500 and detects the position of the finger (coordinate reference point) based on the light reflected off the finger. The sensor unit 400 then transmits a finger position signal and an attitude signal to the control apparatus 200 (see FIG. 1).

The communication section 270 in the control apparatus 200 forwards the finger position signal to the recognition section 220. The recognition section 220 virtually sets a key layout on the keyboard object 500 based on the finger position signal. In this process, the recognition section 220 positions the key "Q" at the upper left corner of the keyboard object 500 with which the finger of the user is in contact and the key "ENTER" at the lower right corner of the keyboard object 500 with which the other finger of the user is in contact (positioning). The recognition section 220 further allocates the other keys based on the positions of the keys "Q" and "ENTER" (reference points) set based on the finger position signal (allocation).

The recognition section 220 may alternatively position the key "Q" at the upper left corner of the keyboard object 500 and the key "ENTER" at the lower right corner of the keyboard object 500 (positioning) not based on the finger position signal but based on the image signal carrying the image of the keyboard object 500 and the attitude signal. The recognition section 220 further allocates the other keys (allocation) based on the thus positioned keys "Q" and "ENTER" (reference points).

The display apparatus 100 may project another image (image showing a region where an operationally inputted character string is displayed) in the image pickup area of the image pickup section 21 in such a way that the other image does not overlap with the key image showing the key layout. Further, the display apparatus 100 may adjust the size of the key image based on a user's operational input (mode specification) before projection.

Figure 9:
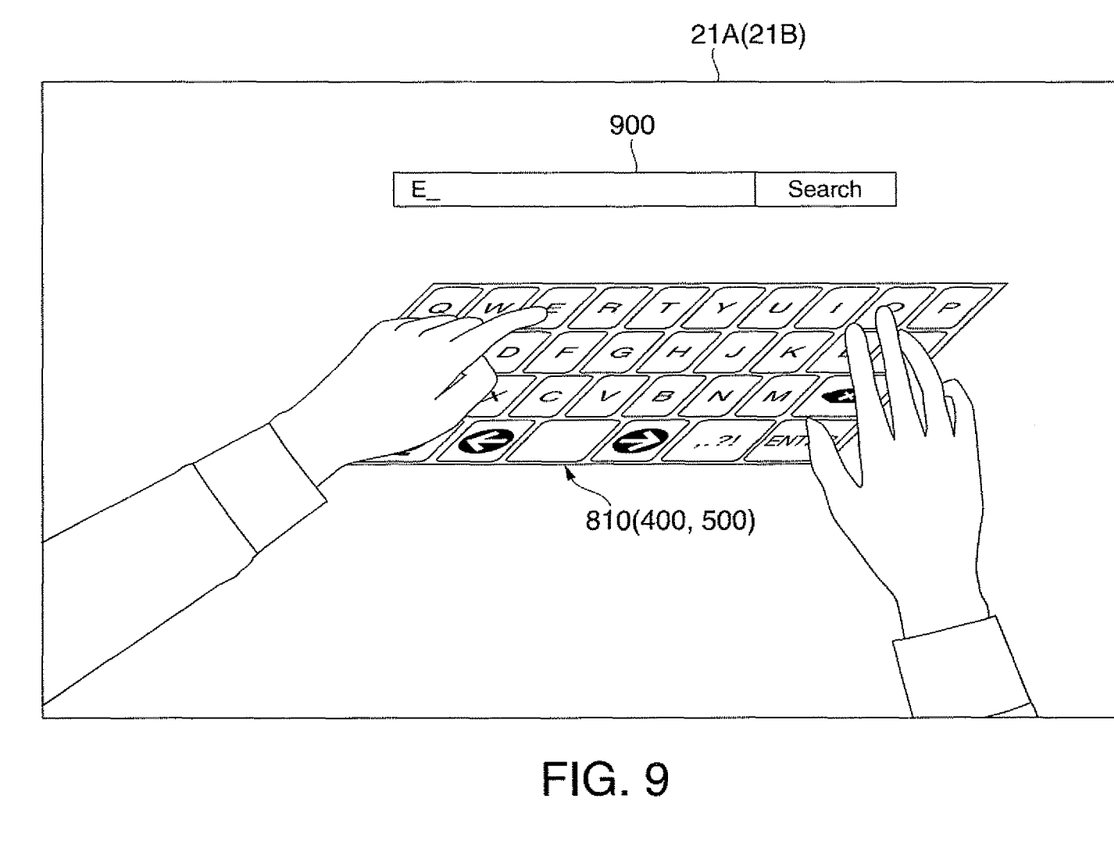
FIG. 9 shows an example of display presented when a key image is superimposed on an optical image of the keyboard object in the embodiment of the invention.

FIG. 9 shows an example of display presented when a key image is superimposed on an optical image of the keyboard object. Based on a signal representing the type of selected input device, the recognition section 220 acquires a key image of the selected input device from the storage section 240.

The communication section 270 in the control apparatus 200 forwards the attitude signal to the recognition section 220. The recognition section 220 deforms a key image 810 acquired from the storage section 240 as required based on the image signal carrying the image of the keyboard object 500 and the attitude signal in such a way that the size and shape of the optical image of the keyboard object 500 and the size and shape of the key image 810 agree with each other in the image pickup area of the image pickup section 21. For example, the recognition section 220 may deform the key image 810 into a shape seen in a perspective view.

The recognition section 220 further corrects the position of the key image in the image pickup area of the image pickup section 21 based on the image signal carrying the image of the keyboard object 500 and the attitude signal in such a way that the position where the optical image of the keyboard object 500 is displayed and the position where the key image acquired from the storage section 240 is displayed agree with each other in the image pickup area of the image pickup section 21. The recognition section 220 outputs an image signal carrying the thus deformed, corrected key image 810 (original key image when no deformation or correction is made) to the control section 230.

The control section 230 receives the image signal carrying the deformed, corrected key image 810 (original key image when no deformation or correction is made) from the recognition section 220 and forwards the received image signal to the display apparatus 100. Based on the image signal inputted from the control section 230, the image output section for the left eye 110A (see FIG. 1) of the display apparatus 100 displays the key image 810 in the position of the optical image of the keyboard object 500 in the image pickup area of the image pickup section 21. The same holds true for the image output section for the right eye 110B of the display apparatus 100. As a result, the key image 810 is superimposed on the optical image of the keyboard object 500 in the image pickup area of the image pickup section 21. The display apparatus 100 may further display an image showing a region where an operationally inputted character string is displayed (operationally inputted image).

The sensor unit 400 projects infrared light onto a finger that is in contact with the keyboard object 500 (that is typing something one with the keyboard object 500) and detects the position of the finger based on the light reflected off the finger. The sensor unit 400 continues transmitting the finger position signal and the attitude signal to the control apparatus 200.

The recognition section 220 recognizes a key operated (typed) by the finger of the user based on the position of the finger relative to the reference point contained in the finger position signal and the coordinates of each key. The recognition section 220 forwards operated key identification information to the control section 230.

The control section 230 carries out a process related in advance to the operated key identification information. For example, the control section 230 projects a character related to the operated key in the image pickup area of the image pickup section 21 of the display apparatus 100. That is, the display apparatus 100 receives the operational input from the operated key.

FIG. 9 shows a state in which user's operation of a key "E" displays an operationally inputted character "E" on an operationally inputted image 900. For example, the control section 230 may search the character string operationally inputted as described above over a computer network.

As described above, the display system includes the sensor unit 400, which detects the position of a pointing object (user's finger, touch pen, for example) in contact with the keyboard object 500, the control apparatus 200, which sets a key layout on the keyboard object 500 and recognizes a key operated by the pointing object based on the position of the pointing object relative to the key layout, and the display apparatus 100, which can be worn around the head of the user and receives an operational input from the operated key.

In the configuration described above, the control apparatus sets a key layout on an object and recognizes a key operated by a finger based on the position of the finger relative to the key layout, whereby the display system requires no dedicated input device and hence can increase its operability and mobility.

That is, the display system can operate with a simplified input device by using an object provided by the user as the input device. When the user needs to input a character in TWITTER®, an e-mail, and other situations, the user can not only readily input a character irrespective of the skill of the user but also conveniently carry the display system.

When the display apparatus is a see-through-type head mounted display (transmissive display apparatus), a large input device is not required. In this case, the user can make the best possible use of a feature of a transmissive display apparatus, that is, the fact that both hands are free. Further, when an input device is required, the user can readily use an object to which the sensor unit 400 is attached as the input device, whereby the user can conveniently use the display system.

Further, the display system allows the user to input a character while a key input made by operating the keyboard object 500 reflects on a software keyboard displayed on the head mounted display.

An embodiment of the present invention has been described in detail with reference to the drawings. It is noted that the specific configuration in the embodiment is not necessarily employed and other designs and configurations fall within the scope of the present invention to the extent that they do not depart from the substance thereof.

For example, the sensor unit 400 may alternatively be attached to a finger of the user. Further, for example, the operation section 210 may detect the position on the operation surface with which a finger of the user is in contact in the form of relative coordinates on the operation surface. Moreover, for example, the display apparatus 100 may be a head-up display (transmissive display apparatus).

Further, for example, the recognition section 220 may virtually cut part of a wide flat surface, such as a desk, and use the thus virtually cut region as the keyboard object 500.

Further, for example, the projection optical system, the light guide section, and the image pickup section in the display apparatus 100 may be replaced with a pupil-division see-through optical system or a half-silvered-mirror-based see-through optical system. Moreover, for example, the display apparatus 100 may not necessarily include the projection optical system, the light guide section, or the image pickup section but may instead include the optical system provided in the image display apparatus (JP-A-2008-20770), the head mounted display (Japanese Patent No. 4,636,164), the beam-scan display apparatus (International Publication No. 2009/041055), or the display apparatus (Japanese Patent No. 4,055,283).

A program for implementing the display system described above may be recorded on a computer readable recording medium, and the program may then be read and executed by a computer system. The term "computer system" used herein is intended to encompass an OS, a peripheral device, and other hardware components. Further, the term "computer readable recording medium" used herein means a flexible disk, a magneto-optical disk, a ROM, a CD-ROM, and other mobile media, a hard disk drive and other storage devices built in the computer system. The term "computer readable recording medium" used herein is further intended to encompass a component that holds a program for a fixed period, such as a volatile memory (RAM) in a computer system that works as a server or a client when a program is transmitted over the Internet or any other network or a telephone circuit or any other communication circuit. The program may be transmitted from a computer system including a storage device or any other component that stores the program to another computer system via a transmission medium or a transmission wave traveling through a transmission medium. The term "transmission medium" used herein, through which the program is transmitted, means a medium having a function of transmitting information, such as the Internet and other networks (communication networks) and a telephone circuit and other communication circuits (communication lines). The program described above may alternatively implement part of the function described above. The program may still alternatively implement the function described above when combined with a program having already been stored in a computer system, what is called a difference file (difference program).

The entire disclosure of Japanese Patent Application No. 2011-258698, filed Nov. 28, 2011 is expressly incorporated by reference herein.

What is claimed is:

1. A display system comprising:
a sensor unit that detects the position of a pointing object in contact with a predetermined object, the sensor unit being directly disposed on the predetermined object;
a control apparatus that sets a key layout on the predetermined object and recognizes a key operated by the pointing object based on the position of the pointing object relative to the key layout; and
a display apparatus that is wearable around the head of a user and receives operational input from the operated key, the display apparatus including an image pickup section disposed on the display apparatus in a viewing path of an eye of the user, the image pickup section including a triangular prism and having an image pickup area, wherein
the image pickup section presents predetermined image light visible to the user in the image pickup area, and the image pickup area transmits externally incident light,
wherein the sensor unit comprises:
an oscillation detector configured to detect a magnitude of oscillation applied to the predetermined object by the pointing object and to output a signal corresponding to the magnitude of oscillation to a position detector; and
an oscillator configured to oscillate the predetermined object based on the signal, the oscillator oscillating at the magnitude of oscillation controlled by the position detector, and
the magnitude of oscillation physically oscillates the predetermined object in order to provide haptic feedback when the user operates the operated key in the key layout.

2. The display system according to claim 1, wherein the display apparatus superimposes a key image showing the key layout contained in the predetermined image light on an optical image of the predetermined object having passed through the image pickup area based on the position of the display apparatus relative to the predetermined object and displays the resultant image.

3. The display system according to claim 2, wherein the display apparatus displays the key image after adjusting the size thereof.

4. The display system according to claim 1, wherein the display apparatus displays another image in the image pickup area in such a way that the other image does not overlap with the key image showing the key layout.

5. The display system according to claim 1, wherein the control apparatus sets the key layout based on the position of the pointing object having come into contact with the predetermined object.

6. The display system according to claim 1, wherein the control apparatus sets the key layout based on user's selection.

7. The display system according to claim 1, wherein the sensor unit captures an image of the pointing object and detects the position of the pointing object based on the captured image of the pointing object.

8. The display system according to claim 1, wherein the display apparatus includes
an image output section that outputs the predetermined image light,
a projection optical system that projects the predetermined image light outputted from the image output section, and
a light guide section that guides the predetermined image light projected through the projection optical system to the image pickup area.

9. The display system according to claim 1, wherein the control apparatus sets a key layout on the predetermined object according to a calibration operation in which the key layout is set based on a relationship of at least two keys on the predetermined object.

10. The display system according to claim 1, wherein the image pickup section including the prism is disposed in a display portion of the display apparatus.

11. The display system according to claim 1, further comprising a light guide section configured to house the image pickup section, wherein the image pickup section including the prism is disposed in a display portion of the light guide section.

12. The display system according to claim 1, wherein the position detector is configured to detect the position of the pointing object in contact with the predetermined object relative to the sensor unit.

13. The display system according to claim 12, wherein the position detector is configured to position the predetermined object by determining reference coordinates on the predetermined object corresponding to the detected position of the pointing object in contact with the predetermined object.

14. The display system according to claim 12, wherein the position detector projects at least one of an infrared light flux and an ultrasonic wave and detects the position of the pointing object based on reflection from the pointing object.

15. The display system according to claim 13, wherein the position detector is further configured to determine at least one subsequent position of the pointing object relative to the reference coordinates based on the position of the predetermined object and to output the at least one subsequent position to a communication unit.

16. An operation input method used with a display system, the method comprising:
setting a key layout on a predetermined object by using a control apparatus;
detecting the position of a pointing object having come into contact with the predetermined object by using a sensor unit, the sensor unit being directly disposed on the predetermined object;

detecting a magnitude of oscillation applied to the predetermined object by the pointing object;

outputting a signal corresponding to the magnitude of oscillation to a position detector;

oscillating the predetermined object based on the signal at the magnitude of oscillation controlled by the position detector;

recognizing a key operated by the pointing object based on the position of the pointing object relative to the key layout by using the control apparatus; and receiving operational input from the operated key by using a display apparatus wearable around the head of a user, the display apparatus including an image pickup section disposed on the display apparatus in a viewing path of an eye of the user, the image pickup section including a triangular prism and having an image pickup area, wherein the image pickup section presents predetermined image light visible to the user in the image pickup area, and the image pickup area transmits externally incident light, and the magnitude of oscillation physically oscillates the predetermined object in order to provide haptic feedback when the user operates the operated key in the key layout.

17. The operation input method according to claim 16, wherein the key layout is set according to a calibration operation in which the key layout is set based on a relationship of at least two keys on the predetermined object.

18. The operation input method according to claim 16, further comprising:

positioning the predetermined object by determining reference coordinates on the predetermined object corresponding to the detected position of the pointing object in contact with the predetermined object;

after positioning the predetermined object, determining at least one subsequent position of the pointing object relative to the reference coordinates based on the position of the predetermined object; and outputting the at least one subsequent position to a communication unit.

* * * * *